United States Patent [19]
Magrum

[11] Patent Number: 5,837,089
[45] Date of Patent: Nov. 17, 1998

[54] HEAT REACTIVATABLE ADHESIVE

[75] Inventor: Glenn Robert Magrum, Ashland, Ohio

[73] Assignee: Ashland Inc., Russell, Ky.

[21] Appl. No.: 636,080

[22] Filed: Apr. 22, 1996

Related U.S. Application Data

[63] Continuation-in-part of Ser. No. 442,087, May 16, 1995, abandoned, which is a continuation of Ser. No. 180,937, Jan. 12, 1994, abandoned.

[51] Int. Cl.$^6$ .................................................. C09J 123/04
[52] U.S. Cl. ...................... 156/275.5; 156/332; 524/276; 524/475; 524/501; 524/524
[58] Field of Search .................. 524/276, 475, 524/501, 524; 156/184–275.5, 331.4, 332

[56] References Cited

PUBLICATIONS

*Drewax™ Specialty Waxes Fact Sheet*, 1994 Ashland Oil, Inc.
*Table 6: SC Johnson Joncryl 50 Overprint Varnish*, (No date available).
*Guide to Selecting Slip–Ayd Surface Conditions*, pp. 12–13 (No date available).
DSX–1550 Rhoelogy Modifier Data Sheet ARC–133, 1994 Henkel Corporation.
*Hawley's Condensed Chemical Dictionary*, Van Nostrand Reinhold Company Limited, 1987, p. 226.

*Primary Examiner*—Romulo H. Delmendo
*Attorney, Agent, or Firm*—Mary E. Picken

[57] ABSTRACT

This invention is a method of using a heat activatable adhesive for laminating vinyl sheet to wood. The organic solvent-free adhesive combines a reactive styrene-acrylic latex emulsion, an ethylene vinyl acetate copolymer emulsion, and a wax. After application to the vinyl substrate the adhesive is heat activated at temperatures as low as 160° F. (71° C.) and the laminate resists delamination at 190° F. (88° C.).

7 Claims, No Drawings

HEAT REACTIVATABLE ADHESIVE

This application is a continuation-in-part of application No. 08/442,087, filed on May 16, 1995, now abandoned, which is a continuation of No. 08/180,937, filed Jan. 12, 1994, now abandoned.

This invention relates to water-based adhesives for bladder pressing, vacuum pressing and laminating vinyl to wood substrates.

BACKGROUND OF THE INVENTION

A variety of adhesives have been developed for use in laminating wood substrates and in laminating wood substrates to vinyl substrates.

Among the wood laminating adhesives is that described in U.S. Pat. No. 3,931,088 Kuraray which combines an isocyanate polymer in solvent with aqueous polyvinyl alcohol, aqueous vinyl acetate, or aqueous butadiene polymer. This adhesive provides excellent bonding in wood-to-wood applications. However, in specialty applications where a flexible substrate such as plastic sheeting or film is bonded to wood, the degree of adhesiveness at the plastic interface exhibited by such compositions is less than desired.

U.S. Pat. No. 4,396,738 Ashland describes a wood-to-wood adhesive made with a vinyl polymer and a partially reacted polyisocyanate.

U.S. Pat. No. 4,433,095 Bayer describes a wood-to-wood adhesive made from aromatic isocyanate and an emulsifier made from isocyanate and alcohol.

U.S. Pat. No. 4,491,646 Ashland describes a wood-to-wood adhesive which combines an aqueous hydroxyl functional acrylic latex containing hydroxyl groups as its only isocyanate reactive functionality and a multi-isocyanate crosslinking agent.

U.S. Pat. No. 4,609,690 Ashland describes a wood laminating adhesive curable at room temperature which combines an aqueous hydroxyl-functional acrylic latex with emulsified multi-isocyanate crosslinking agent.

None of these wood-to-wood adhesives makes very strong bonds when used to adhere vinyl substrates to wood substrates. They also suffer from the drawback of having very short pot-lives. Various adhesives especially designed for adhering wood to vinyl have been developed. Because vinyl softens at temperatures around 200° F., these vinyl to wood adhesives must activate or cure below 200° F., they must however be able to withstand high temperatures because the adhered substrates are used in hot kitchens, mobile homes, and automobile interiors where temperatures may climb above 200° F. for short time periods.

European Patent Application 367120 Air Products describes a water-based adhesive for laminating vinyl substrates to wood which consists essentially of vinyl acetate-ethylene emulsion copolymer and water dispersible polyisocyanate, has a pot life of 6 hours and passes a heat and creep resistant test at 170° F.

European Patent Application 444259 Bayer describes a laminating adhesive for PVC or PVC foam and ABS made of polyurethane dispersions forming films below 70° C., copolymers of a,b-unsaturated monomers such as styrene having a softening point above 70° C., and, optionally, dispersible reactive aliphatic polyisocyanate.

U.S. Pat. No. 4,618,390 Ashland describes an adhesive for bonding a vinyl substrate to a rigid wood substrate. The adhesive is an aqueous emulsion of butylacrylate-methylmethacrylate-2 hydroxyethyl acrylate terpolymer, polypropylene glycol and polyisocyanate having a pot life of at least one hour. This adhesive is applied by roll coater to one substrate, the second vinyl substrate is applied immediately. The manufacturer of wood-vinyl laminates uses the bonding adhesive directly and must see that coating equipment spreads the liquid adhesive evenly and completely.

It would be desirable to have an adhesive which is applied, not at the facility where the vinyl is laminated to the wood substrate, but at another location where the adhesive is applied to the vinyl substrate, dried, and then at a convenient later date, is heat activated. The laminator would then simply apply the coated vinyl to the wood using heat and pressure to activate the adhesive and avoid all complications of applying liquid adhesive. The laminated vinyl-adhesive-wood product should withstand environments hotter than 200° F.

OBJECT OF THE INVENTION

It is therefore an object of this invention to develop a strong water-based adhesive which is applied to vinyl substrate, dried, then heat activated at temperatures as low as 150° F. to join vinyl to wood substrates forming a strong bond which will withstand exposure to temperatures as high as 250° F.

SUMMARY OF THE INVENTION

This invention is a method of using a heat-activatable adhesive for laminating vinyl sheet to wood substrates. This solvent-free adhesive combines a reactive styrene-acrylic latex emulsion and a vinyl acetate-ethylenecopolymer emulsion, vinyl acetate-butyl acrylate copolymer emulsion, or vinyl acetate-butyl acrylate-2 ethylhexyl acrylate terpolymer emulsion, having certain glass transition temperatures (Tg) as measured by ASTME 1356. Optionally, one or more of itaconic acid, glyoxal, zinc acetyl acetonate catalyst, and a stable nonreactive aliphatic water-based polyurethane dispersion, also having a specific Tg, may be added. After applying the adhesive on the vinyl, the adhesive is dried, the coated vinyl is rolled and shipped to the customer. The customer forms or laminates the adhesive coated vinyl on to the customer's wood substrate and the adhesive is heat activated at temperatures of 160° F. or 170° F. depending on the combination of ingredients in the adhesive. After lamination to a wood substrate the laminate resists temperatures greater than 200° F.

DESCRIPTION OF THE PREFERRED EMBODIMENTS

Vinyl films which can be used in the present invention include cast, calendered and extruded vinyl films. Suitable vinyl films, include polyvinyl chloride, copolymers of vinyl chloride, such as vinyl chloride-vinyl acetate copolymers, polyvinyl fluoride, polyvinyl formal, polyvinylidene chloride, polyvinyl butyral, polyvinylidene fluoride, and the like. The preferred vinyl film for use in the present invention is a polyvinyl chloride film. Vinyl films of any thickness between 4 and 30 mils may be used in the present invention. It is not necessary to use a primer on vinyl substrates when the "primerless" adhesive of this invention is used. Among other useful flexible substrates are paper and cloth. Suitable substrates for lamination with the adhesive of this invention may be fibrous, non-fibrous, porous and non-porous, metallic and non-metallic, polymeric, leather, cork, wood and glass. The preferred rigid substrate in the practice of this invention is particle board.

The first ingredient of the adhesive of this invention is a reactive styrene-acrylic latex emulsion. This emulsion can be made from acrylic acid, methyl methacrylate, styrene, hydroxy ethyl acrylate, butyl acrylate polymer, water and ethyl acrylate. The pH may be 6.5 to 8. Useful reactive styrene-acrylic latex emulsions include:

Rohm & Haas 76 RES 1026 styrene-butyl acrylate emulsion −32° C. Tg±6° C.

Rohm & Haas Rhoplex P-376 styrene-butyl acrylate emulsion +21° C. Tg±6° C.

Rohm & Haas 76 RES 1018 styrene-butyl acrylate emulsion +22° C. Tg±6° C.

Rohm & Haas HSB6 styrene-butyl acrylate-ethyl acrylate-methyl methacrylate emulsion 12° C. Tg±10° C. and 48°±10° C. (bimodal)

Rohm & Haas 76 RES 1019 styrene-butyl acrylate emulsion −15° C. Tg±6° C.

Rohm & Haas 76 RES 1026 styrene-butyl acrylate emulsion −32° C. Tg±6° C.

Union Carbide UCAR 462 styrene-butyl acrylate-methyl methacrylate-hydroxyethyl acrylate emulsion 45°±6° C. Tg Union Carbide UCAR 451 styrene-ethyl acrylate-hydroxyethylacrylate-acrylic acid emulsion 42°±5° C. Tg Composition analysis as determined from the NMR spectrum is presented below:

|  | RES 1018 | | RES 1019 | | RES 1026 | |
| --- | --- | --- | --- | --- | --- | --- |
|  | Mole % | Wt. % | Mole % | Wt. % | Mole % | Wt. % |
| Styrene | 54 | 49 | 33 | 29 | 16 | 13 |
| Butyl Acrylate | 46 | 51 | 67 | 71 | 84 | 87 |

|  | RHOPLEX P-376 | |  | HSB6 | |
| --- | --- | --- | --- | --- | --- |
|  | Mole % | Wt. % |  | Mole % | Wt. % |
| Styrene | 49 | 44 | Styrene | 46.4 | 42.2 |
| Butyl Acrylate | 51 | 56 | Butyl Acrylate | 44.7 | 50.0 |
|  |  |  | Ethyl Acrylate | 4.3 | 3.7 |
|  |  |  | Methyl Methacrylate | 4.6 | 4.1 |

|  | UCAR 451 | |  | UCAR 462 | |
| --- | --- | --- | --- | --- | --- |
|  | Mole % | Wt. % |  | Mole % | Wt. % |
| Styrene | 39.6 | 44.1 | Styrene | 22.5 | 20.7 |
| Ethyl Acrylate | 44.6 | 41.1 | Butyl Acrylate | 41.8 | 47.2 |
| Hydroxyethyl Acrylate | 5.5 | 6.9 | Methyl Methacrylate | 31.9 | 28.2 |
| Acrylic Acid | 10.3 | 7.9 | Hydroxyethyl Acrylate | 3.8 | 3.9 |

The most preferred reactive styrene-acrylic latex emulsion is styrene-butyl acrylate-methyl methacrylate-hydroxy ethyl acrylate having a Tg of 45°±6° C. for making laminates having the best strength at room temperature. For making laminates having the best strength when tested at temperatures as high as 200° F. (93° C.) the most preferred styrene acrylic is styrene-butyl acrylate-ethyl acrylate-methyl methacrylate emulsion having a bimodal Tg distribution of 12°±6° C. and 48°±6° C.

From 30 to 70 weight percent reactive styrene acrylic emulsion is used in the heat activated vinyl to wood laminating adhesive of this invention.

The second ingredient of the adhesive of this invention is a vinyl acetate-copolymer emulsion having a Tg between −5° C. and 10° C. This vinyl acetate-copolymer emulsion can be either a vinyl acetate-ethylene copolymer emulsion, vinyl acetate-butyl acrylate copolymer emulsion, or vinyl acetate-butyl acrylate-2 ethyl hexyl acrylate copolymer emulsion. Useful vinyl acetate-acrylic copolymer emulsions include LAM2 vinyl acetate-butyl acrylate copolymer emulsion having a Tg of 10°±10° C. available from Rohm & Haas, Philadelphia, Pa.* Useful vinyl acetate-ethylene copolymer emulsions include Airflex 465 vinyl acetate-ethylene copolymer emulsion having a Tg of −5°±3° C. available from Air Products, Allentown, Pa. From 30 to 70 weight percent vinyl acetate-ethylene copolymer emulsion, vinyl acetate-butyl acrylate copolymer emulsion, or vinyl acetate-butyl acrylate-2 ethylhexyl acrylate terpolymer emulsion is used in the adhesive of this invention.

The third ingredient of the organic solvent free adhesive used in the method and composition of this invention is a wax selected from carnauba wax, paraffin wax, polyethylene wax or mixtures thereof. Carnauba wax is available from Drew Industrial Division of Ashland Chemical Company, Boonton, N.J. Paraffin wax is available from Daniel Products, Jersey City, N.J. as SL 145E paraffin in a 45 percent emulsion in water. A polyethylene/paraffin wax is available from Drew Industrial Division, Ashland Chemical, Boonton, N.J., as Drewax E-9040 40 percent solids emulsion. The polyethylene/paraffin wax is preferred in the invention.

A non-ionic dissociative thickener available from Henkel Corporation, Ambler, Pa. as DSX-1550 clear thickener may also be added to the adhesive of this invention.

Optional ingredients for addition to the adhesive of this invention include a stable non-reactive aliphatic water based urethane having an ionic charge such as Q-Thane QW-16 urethane available from K. J. Quinn, Seabrook, N.H., having a Tg −26° C.±11° C., a polyether based aliphatic polyurethane. From 16 to 35 weight percent aliphatic water based urethane may be used in the adhesive of this invention.

Glyoxal is another optional ingredient. Glyoxal is available from Aldrich Chemical, Milwaukee, Wis. Up to 6 weight percent glyoxal may be used.

Itaconic acid, acrylic acid and methacrylic acid are other optional ingredients and are available from Aldrich Chemical. Up to 6 weight percent acid may be used in the adhesive of this invention.

Zinc acetyl acetonate catalyst is a further optional ingredient, 0.01 to 0.5 weight percent may be used in the adhesive of this invention.

In one embodiment this invention is a method of making a heat stable laminate of a flexible substrate and a solid substrate adhered together by the dried residue of a heat activatable 55 to 65 weight percent reactive styrene-acrylic emulsion, 35 to 45 weight percent ethylene-vinyl acetate emulsion and 1 to 3 percent itaconic acid.

The adhesive of this invention is prepared by first admixing the urethane and other optional ingredients with the vinyl acetate copolymer emulsion. To this mixture the styrene-acrylic copolymer is added. These are mixed for 30 minutes. The adhesive can then be used immediately or stored for at least two months without detrimental effects on its bonding capability. If a higher viscosity product is desired, cellulosic and urethane based thickening agents can be added. Silica based products, defoamers, coalescing aids, and extenders can also be added at this point.

The adhesive of this invention is used by coating the adhesive by any of a variety of common coating methods onto a vinyl or paper substrate and drying. The coated substrate is then heat reactivated at temperatures greater than 150° F. (65° C.) and pressed onto the second substrate of choice, which may be wood, steel, glass or foam. Bladder pressing, nip rolling, and vacuum pressing are common methods for accomplishing this. Match metal presses, roller presses and platen presses may also be used.

All references cited herein are hereby expressly incorporated by reference. In order to further illustrate the manner in which the present invention can be implemented, the following working examples are given. All parts and percentages referred to therein are by weight unless otherwise indicated.

The following examples show adhesives of this invention which are activated at 170° F. (77° C.) and 150 (65° C.) or 155° F. (68° C.).

EXAMPLE 1 170° F. Activation

Reported in Table 1 are peel strengths ("PLI" means pounds per linear inch) at room temperature and at 180° F. (82° C.) of vinyl-wood laminates.

TABLE 1

PRELAM 170
77° C., 2 BAR, 3 MINUTES

| ADHESIVE | PEEL STRENGTH (PLI) RT | 82° C. | PRE-HEATED |
|---|---|---|---|
| HSB6 styrene-acrylic | 2.11 | 4.68 | 1.71 |
| LAM2 vinyl acetate-butyl acrylate | 2.25 | 1.19 | 3.28 |
| LAM2/HSB6[1] | 2.35 | 6.01 | 1.88 |
| PRELAM 170, NO CATALYST[2] | 4.05 | 5.87 | 1.7 |
| PRELAM 170, NO GLYOXAL[3] | 5.05 | 6.81 | 2 |
| PRELAM 170, NO ITACONIC ACID[4] | 3.33 | 7.87 | 1.5 |
| PRELAM 170[5] | 4.81 | 6.63 | 1.28 |
| PRELAM 170, NO ITACONIC ACID OR CATALYST[6] | 4.34 | 7.15 | 1.32 |
| PRELAM 170, NO GLYOXAL OR CATALYST[7] | 3.44 | 5.81 | 1.49 |

"Preheated" means heated to 71° C. for 3 minutes, cooled, then applied to wood substrate
RT is room temperature

TABLE 2

160° F. Activation (71° C.)
2 BAR; 3 MINUTES

| ADHESIVE | PEEL STRENGTH (PLI) RT | 180° C. | PRE-HEATED[a] RT |
|---|---|---|---|
| UCAR 462 styrene-acrylic | 0.61 | 3.28* | 1.38 |
| HSB6 styrene-acrylic | 0.46 | 4.68* | 1.71 |
| LAM2 vinyl acetate-butyl acrylate | 0 | 1.19* | 3.28 |
| QW16 aliphatic water based urethane | 1.77 | 2.95 | 5.59 |
| LAM2/QW16[1] | 1.82 | 4.18 | 4.28 |
| UCAR 462/LAM2[2] | 1.65 | 2.88* | 1.72 |
| UCAR 462/QW16[3] | 1.79 | 5.47 | 1.69 |
| LAM2/HSB6[2] | 1.67 | 6.01* | 1.88 |
| PRELAM 160[4] | 5.91 | 6.04 | 1.61 |
| PRELAM 160[5] | 4.34 | 7.25 | |
| HSB6/QW16[6] | 1.42 | 9.88 | 2.37 |

[a]Heated to 160° F. (71° C.) in the press at 0.531 A atmospheres, cooled, then laminated at 77° C.

Example 2 and Table 2 show that a laminating adhesive activatable at 160° F. (71° C.) can be prepared by combining vinyl acetate-butyl acrylate copolymer, styrene-acrylic with Tg 35° C.–48° C. and aliphatic water based urethane (footnote 4). An adhesive activatable at 160° F. (71° C.) can also be prepared by combining vinyl acetate-butyl acrylate copolymer, styrene acrylic with Tg of 42°±5° C., and aliphatic water based urethane. (footnote 5). Both adhesives are strong at room temperature and when tested at 180° F. for heat resistance.

EXAMPLE 3

Example 3 compares peel strength and substrate fiber tear of laminating adhesives of this invention made with RES 1026 styrene-acrylic having a Tg of –32° C., vinyl acetate-ethylene copolymer having Tg –5°±3° C. (AP 465) and vinyl acetate-butyl acrylate copolymer having a Tg 10° C.±10° C. (LAM 2) at different levels of water based urethane. The vinyl to particle board laminates were made at 160° F. (71° C.), using 2 atmospheres pressure for 3 minutes. Fiber tear was tested at room temperature.

TABLE 3

| | 1 | 2 | 3 | 4 | 5 | 6* | 7 | 8 | 9 | 10 | 11 |
|---|---|---|---|---|---|---|---|---|---|---|---|
| Styrene acrylic RES 1026 Tg –32° C. | 60 | 60 | 60 | 60 | 60 | 60 | 60 | 60 | 60 | 60 | 60 |
| vinyl acetate-butyl acrylate LAM 2 Tg 10° ± 10° C. | 40 | 40 | 40 | 40 | 40 | 40 | | | | | |
| vinyl acetate-ethylene AP 465 Tg –5 ± 3° C. | | | | | | | 40 | 40 | 40 | 40 | 40 |
| Urethane % | 16.7 | 21 | 25 | 28.6 | 0 | 0 | 16.7 | 21 | 25 | 28.6 | 0 |
| Peel Strength | 6.8 | 8.4 | 8.6 | 10.2 | 3.1 | 5.9 | 3.6 | 4.8 | 7.4 | 5.0 | 2.1 |
| % Fiber Tear | 10 | 10 | 10 | 5 | 0 | 10 | 50 | 50 | 65 | 50 | 0 |

*6 also contains glyoxal, itaconic acid and catalyst

Table 3 shows that optimum levels of water based urethane are 25 to 30 percent and that vinyl acetate copolymers having Tg of −5°±3° C. and 10° C.±10° C. are effective in the laminating adhesive of this invention.

EXAMPLE 4

Tables 4, 5, 6, 7, 8 and 9 report peel strength and fiber tear of laminating adhesives used with vinyl and wood. Styrene-acrylic copolymer emulsions having various glass transition temperatures are combined with vinyl acetate copolymers and different levels of aliphatic water based urethane.

TABLE 4

|  | 12 | 13 | 14 | 15 | 16 | 17 | 18 | 19 | 20 | 21 |
|---|---|---|---|---|---|---|---|---|---|---|
| Styrene-acrylic UCAR 462[1] | 60 | 60 | 60 | 60 | 60 | 60 | 60 | 60 | 60 | 60 |
| LAM2[2] | 40 | 40 | 40 | 40 | 40 |  |  |  |  |  |
| AP 465[3] |  |  |  |  |  | 40 | 40 | 40 | 40 | 40 |
| % urethane[4] | 16.7 | 21 | 25 | 28.6 | 0 | 16.7 | 21 | 25 | 28.6 | 0 |
| peel strength | 2.2 | 4 | 5.91 | 4.3 | 1.65 | 1.9 | 2.9 | 3.5 | 2.2 | 1.8 |
| % fiber tear | 90 | 97 | 100 | 100 | 80 | 90 | 100 | 95 | 95 | 80 |

[1]Tg 45 ± 5
[2]vinyl acetate-butyl acrylate copolymer emulsion Tg 10° C. ± 10° C.
[3]vinyl acetate-ethylene copolymer emulsion Tg −5° C. ± 3°
[4]aliphatic water based urethane

TABLE 5

|  | 22 | 23 | 24 | 25 | 26 | 27 | 28 | 29 | 30 | 31 | 32 |
|---|---|---|---|---|---|---|---|---|---|---|---|
| Styrene-acrylic RES 1019[5] | 60 | 60 | 60 | 60 | 60 | 60 | 60 | 60 | 60 | 60 | 60 |
| LAM2[6] | 40 | 40 | 40 | 40 | 40 | 40 |  |  |  |  |  |
| AP465[7] |  |  |  |  |  |  | 40 | 40 | 40 | 40 | 40 |
| % urethane[8] | 16.7 | 21 | 25 | 28.6 | 0 | 0 | 16.7 | 21 | 25 | 28.6 | 0 |
| peel strength | 3.7 | 6.1 | 5.8 | 3.1 | 3.1 | 5.2 | 2.1 | 2.6 | 4.7 | 5.1 | 1.8 |
| % fiber tear | 2 | 5 | 2 | 2 | 0 | 2 | 90 | 95 | 100 | 99 | 85 |

[5]Tg −15° C.
[6]vinyl acetate-butyl acrylate copolymer emulsion Tg 10° ± 10° C.
[7]vinyl acetate-ethylene copolymer emulsion TG −5° ± 6° C.
[8]aliphatic water based urethane

TABLE 6

|  | 33 | 34 | 35 | 36 | 37 | 38 | 39 | 40 | 41 | 42 |
|---|---|---|---|---|---|---|---|---|---|---|
| Styrene-acrylic HSB6[9] | 60 | 60 | 60 | 60 | 60 | 60 | 60 | 60 | 60 | 60 |
| LAM2[10] | 40 | 40 | 40 | 40 | 40 |  |  |  |  |  |
| AP465[11] |  |  |  |  |  | 40 | 40 | 40 | 40 | 40 |
| % urethane[12] | 16.7 | 21 | 25 | 28.6 | 0 | 16.7 | 21 | 25 | 28.6 | 0 |
| peel strength | 2.8 | 3.4 | 4.3 | 3.3 | 1.7 | 2.8 | 3.4 | 6 | 3.8 | 2.6 |
| % fiber tear | 85 | 90 | 100 | 90 | 50 | 90 | 95 | 98 | 100 | 95 |

[9]Tg 12 ± 6° C. and 48 ± 6° C.
[10]vinyl acetate-butyl acrylate copolymer emulsion Tg 10° C. ± 10° C.
[11]vinyl acetate-ethylene copolymer emulsion Tg −5° C. ± 3° C.
[12]aliphatic urethane

TABLE 7

|  | 43 | 44 | 45 | 46 | 47 |
|---|---|---|---|---|---|
| Styrene-acrylic UCAR451[13] | 60 | 60 | 60 | 60 | 60 |
| LAM2[14] | 40 | 40 | 40 | 40 | 40 |
| % urethane[15] | 16.7 | 21 | 25 | 28.6 | 0 |
| peel strength | 2.9 | 2.2 | 2.4 | 3.3 | 3 |
| % fiber tear | 90 | 80 | 85 | 90 | 10 |

[13]Tg 42° C. ± 5°
[14]vinyl acetate-butyl acrylate copolymer emulsion Tg 10° C. ± 10°
[15]aliphatic water based urethane

TABLE 8

|  | 48 | 49 | 50 | 51 | 52 |
|---|---|---|---|---|---|
| Styrene-acrylic P376[16] | 48 | 49 | 50 | 51 | 52 |
| LAM2[17] | 40 | 40 | 40 | 40 | 40 |
| % urethane[18] | 16.7 | 21 | 25 | 28.6 | 0 |
| peel strength | 1.9 | 3.3 | 3.3 | 3.1 | 3.8 |
| % fiber tear | 60 | 90 | 90 | 90 | 80 |

[16]Tg −32° C.
[17]vinyl acetate-butyl acrylate copolymer emulsion Tg 10° ± 10° C.
[18]aliphatic water based urethane

TABLE 9

|                       | 53   | 54 | 55  | 56  | 57  |
|-----------------------|------|----|-----|-----|-----|
| Styrene-acrylic RES 1018[19] | 60   | 60 | 60  | 60  | 60  |
| LAM2[20]              | 40   | 40 | 40  | 40  | 40  |
| % urethane[21]        | 16.7 | 21 | 25  | 0   | 0   |
| peel strength         | 1.9  | 2.1| 3.2 | 2.2 | 2.1 |
| % fiber tear          | 50   | 65 | 30  | 35  | 60  |

[19]+22° Tg
[20]vinyl acetate-butyl acrylate copolymer emulsion Tg 10° ± 10° C.
[21]aliphatic water based urethane Review of Tables 4 through 9 shows that optimum levels of water based urethane are 35 to 30 percent and that styrene-acrylic copolymer emulsions having Tg from −32° C. to +50° C. are effective in the laminating adhesive of this invention.

The most preferred laminating adhesive for strong bonds between vinyl and wood when tested at room temperature is a mixture of a styrene acrylic latex emulsion having a Tg of 45°±6° C., a vinyl acetate-butyl acrylate copolymer having a Tg of 10°±10° C. and a stable non-reactive aliphatic water based urethane.

The most preferred laminating adhesive for strong bonds between vinyl and wood when tested at higher temperatures such as 180° F. (82° C.) is a mixture of a styrene acrylic latex emulsion having a bimodal glass transition temperature distribution of 12°±6° C. and 48°±6° C., a vinyl acetate-butyl acrylate copolymer having a Tg of 10°±10° C., glyoxal, itaconic acid, and, optionally, zinc acetyl acetonate catalyst.

EXAMPLE 5

A formulation was sought that allowed coating an adhesive onto vinyl, then rolling it up without the use of a release liner. This formulation would necessarily then need to withstand the forces of a wound roll of vinyl being shipped in a truck at temperatures up to 150F. The resultant changes would also allow the adhesive to slide on the pressing table on which the final parts are made, at least initially. This would allow parts to be made with less stress inherent in the final vinyl parts. It was hoped that this would allow the final part to have at least equivalent heat resistance to that of parts made with the adhesive that did not contain a wax. The other benefits would be resistance to mechanical marring and lack of dust and dirt pickup by the slight tack inherent in the base adhesive. This would allow parts to made with better esthetics and fewer rejects due to dirt in the bondline telegraphing through the vinyl.

To 400 grams of Airflex 465 ethylene-vinyl acetate copolymer emulsion was added 1600 grams of UCAR 462 styrene-acrylic copolymer emulsion. These were mixed thoroughly for 30 minutes. Next was added slowly with stirring 20 grams of the wax emulsion. This mixture was again mixed thoroughly for 30 minutes. The mixture was ready for use immediately thereafter. Additional additives may be necessary for improving coatability such as defoamers, surfactants, thickening agents, and coalescing aids. Extenders may also be added as desired.

Table 10 shows the benefits of adding different waxes to the adhesive. Although the adhesive lacking wax made a laminate with 170° F. heat resistance, that adhesive stuck to the adjacent rolled-up surface or "blocked" and was not mar resistant. Adhesives containing as little as 2% carnauba wax, paraffin wax, or polyethylene/paraffin wax were anti-blocking and mar-resistant.

TABLE 10

170F Bondline
Effect of Wax on Blocking and Adhesion

| Adhesive | % | Anti-Blocking | Heat Resist. | Mar Resist. | Wax |
|----------|---|---------------|--------------|-------------|-----|
| Blank    | 0 | POOR          | 170          | POOR        |     |
| E7920    | 1 | V. GOOD       | 170          | GOOD        | CARNAUBA |
| E7920    | 2 | V. GOOD       | 170          | GOOD        | CARNAUBA |
| E7920    | 4 | V. GOOD       | 170          | V. GOOD     | CARNAUBA |
| E7030    | 1 | V. GOOD       | 170          | GOOD        | CARNAUBA |
| E7030    | 2 | V. GOOD       | 170          | GOOD        | CARNAUBA |
| E7030    | 4 | EXCELLENT     | 170          | V. GOOD     | CARNAUBA |
| E9040    | 1 | EXCELLENT     | 170          | GOOD        | PE/PARAFFIN |
| E9040    | 2 | EXCELLENT     | 170          | V. GOOD     | PE/PARAFFIN |
| E9040    | 4 | EXCELLENT     | 170          | V. GOOD     | PE/PARAFFIN |
| SL535    | 1 | V. GOOD       | 170          | GOOD        | CARNAUBA |
| SL535    | 2 | EXCELLENT     | 170          | V. GOOD     | CARNAUBA |
| SL145    | 1 | V. GOOD       | 170          | GOOD        | PARAFFIN |
| SL145    | 2 | EXCELLENT     | 170          | V. GOOD     | PARAFFIN |
| SL145    | 4 | EXCELLENT     | 170          | V. GOOD     | PARAFFIN |

The preferred non-blocking formulation of the adhesive of the method and composition of this invention is: 20 parts by weight Airflex 465 ethylene-vinyl acetate, 80 party by weight UCAR 462 styrene/butyl acrylate/methyl methacrylate/ hydroxyethyl acrylate, 0.26 parts by weight Henkel DSX-1550 clear thickener, 5.1 parts by weight deionized water, and 2 to 4 parts by weight Drewax 9094 polyethylene/paraffin 40% wax emulsion.

I claim:

1. A method of making a heat stable laminate of a flexible vinyl substrate and a solid substrate adhered together by the dried residue of a heat activatable organic solvent-free adhesive composition comprising the mixture of:
   a) styrene/butyl acrylate/methyl methacrylate/ hydroxyethyl acrylate copolymer emulsion,
   b) ethylene/vinyl acetate copolymer emulsion, and
   c) wax, comprising the steps of:
   i) applying said adhesive composition using a roll coater onto a vinyl substrate,
   ii) drying said coated vinyl substrate in the absence of a release liner,
   iii) rolling said dried coated vinyl substrate,
   iv) shipping said rolled dried coated vinyl substrate to the laminator customer,
   v) unrolling said substrate into juxtaposition above a solid substrate, and
   vi) applying pressure and heat of greater than 71° C. to heat activate said adhesive, whereby a laminate is formed having resistance to heat of greater than 190° F. (88° C.), said laminate failing by tearing said substrate when tested.

2. The method of claim 1 wherein said adhesive comprises 50 to 60 weight percent a) 30 to 40 weight percent b) emulsion and a positive amount up to 5 weight percent wax.

3. The method of claim 2 wherein said adhesive further comprises up to 25% by weight polyurethane dispersion.

4. The method of claim I wherein said wax is selected from the group consisting of paraffin wax, carnauba wax, polyethylene wax and mixtures thereof.

5. A liquid adhesive composition for use on vinyl substrates which are dried after coating, rolled without a release liner and transported to a manufacturing facility, unrolled, applied to automobile interior structures or doors and heated under pressure comprising styrene/butyl acrylate/methylmethacrylate/hydroxyethyl acrylate copolymer emulsion, ethylene/vinyl acetate copolymer emulsion, and wax.

6. The adhesive of claim 5 wherein said wax is selected from the group consisting of carnauba wax, polyethylene wax, parafin wax, and mixtures thereof.

7. The adhesive of claim 5 further comprising non-ionic dissociative thickener, and polyurethane.

* * * * *